Sept. 1, 1970     L. C. ROTTER ET AL     3,526,297
LUBRICATION PUMP FAILURE DETECTOR
Filed June 18, 1968     3 Sheets-Sheet 1
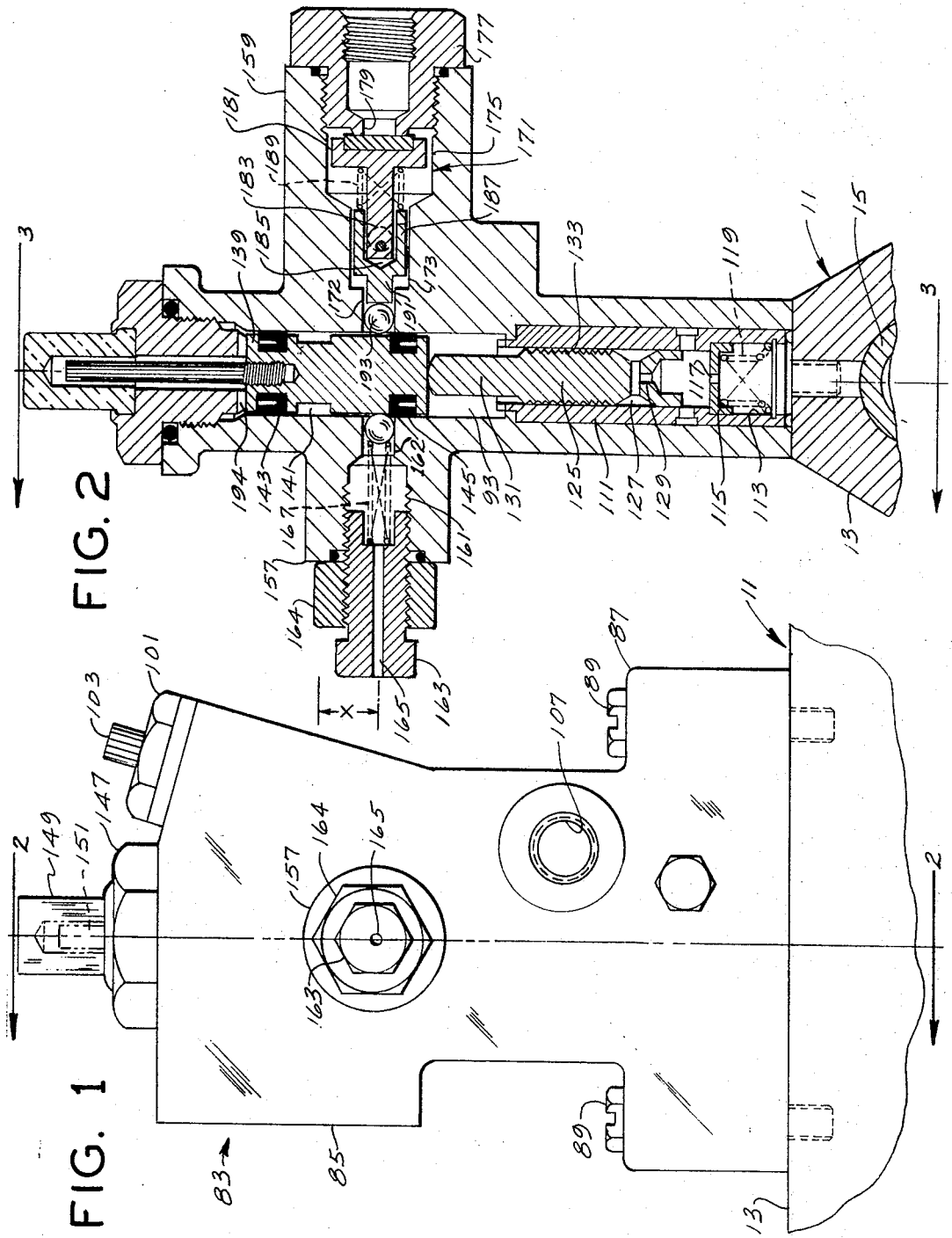
Lutwin C. Rotter and
Jerome L. Wegmann,
Inventors.
Koenig, Senniger,
Powers and Leavitt,
Attorneys.

United States Patent Office 3,526,297
Patented Sept. 1, 1970

3,526,297
LUBRICATION PUMP FAILURE DETECTOR
Lutwin C. Rotter, Ladue, and Jerome B. Wegmann, Florissant, Mo., assignors to McNeil Corporation, Akron, Ohio, a corporation of Ohio
Filed June 18, 1968, Ser. No. 738,040
Int. Cl. F16n 29/04
U.S. Cl. 184—1    12 Claims

ABSTRACT OF THE DISCLOSURE

Apparatus for detecting failure of operation of an intermittently acting lubricant pump or injector of a type having a plunger working in a cylinder to meter out small quantities of lubricant through each of a series of outlet ports on a pressure stroke of the plunger. The apparatus comprises a signal controlled by an air pressure switch supplied with air under pressure from a sensing line, and means for venting the sensing line to effect operation of the signal in response to failure of delivery of lubricant through the last outlet port of the series of a plurality of cycles of the pump or injector, for signalling prolonged failure without signalling a temporary failure.

BACKGROUND OF THE INVENTION

The invention involves an improvement on the failure indicator shown in the coassigned U.S. Pat. 3,322,234 of Carl H. Mueller, Lutwin C. Rotter, Jerome B. Wegmann and George Weitzel, issued May 10, 1967, which is particularly useful for indicating a relatively prolonged failure (as distinguished from a short-term failure) of operation of a lubricant pump or injector of a type comprising a cylinder having a series of outlet ports spaced at intervals along its length, and a plunger working in the cylinder adapted on a pressure stroke to force small metered volumes of lubricant out through each outlet port in the series in succession. As regards the prior failure indicator shown in said patent, the indication of failure is given via a pressure switch (173 in said patent) which is responsive to pressure of lubricant in a lubricant line (169 in said patent) supplied with lubricant from the first outlet port in the series of outlet ports of the injector cylinder. This has been generally satisfactory, but is sensitive to the amount of lubricant delivered thereto, and has not been as foolproof in production and in operation in certain installations as desired.

SUMMARY OF THE INVENTION

Among the several objects of this invention may be noted the provision of an improved failure indicator apparatus of the general class as the prior indicator shown in the aforesaid U.S. Pat. 3,322,234 which is insensitive to the amount of lubricant delivered thereto, and which is more foolproof in production and in operation in the field. Generally, the improvement is effected by utilizing air instead of lubricant as the sensing medium, making the indicator insensitive to the amount of lubricant delivered thereto. More particularly, the improved apparatus comprises a signal which is controlled by air pressure means (instead of lubricant pressure), and means operable in response to failure of delivery of the pump for a plurality of cycles of its operation for controlling the air pressure means to effect operation of the signal, thereby actuating the signal only on a prolonged failure. As will appear, the air pressure means effects operation of the signal on drop of air pressure, and the failure-responsive means is operable to drop the air pressure in response to failure of delivery of the pump for a plurality of cycles of its operation. Other objects and features will be in part apparent and in part pointed out hereinafter.

BRIEF DESCRIPTION OF THE DRAWINGS

FIG. 1 is a side elevation of a failure indicator of this invention on a lubricant injector of the type shown in U.S. Pat. 3,322,234, the injector being only partially shown;
FIG. 2 is a vertical section on line 2—2 of FIG. 1.

DESCRIPTION OF THE PREFERRED EMBODIMENT

Figure 3:
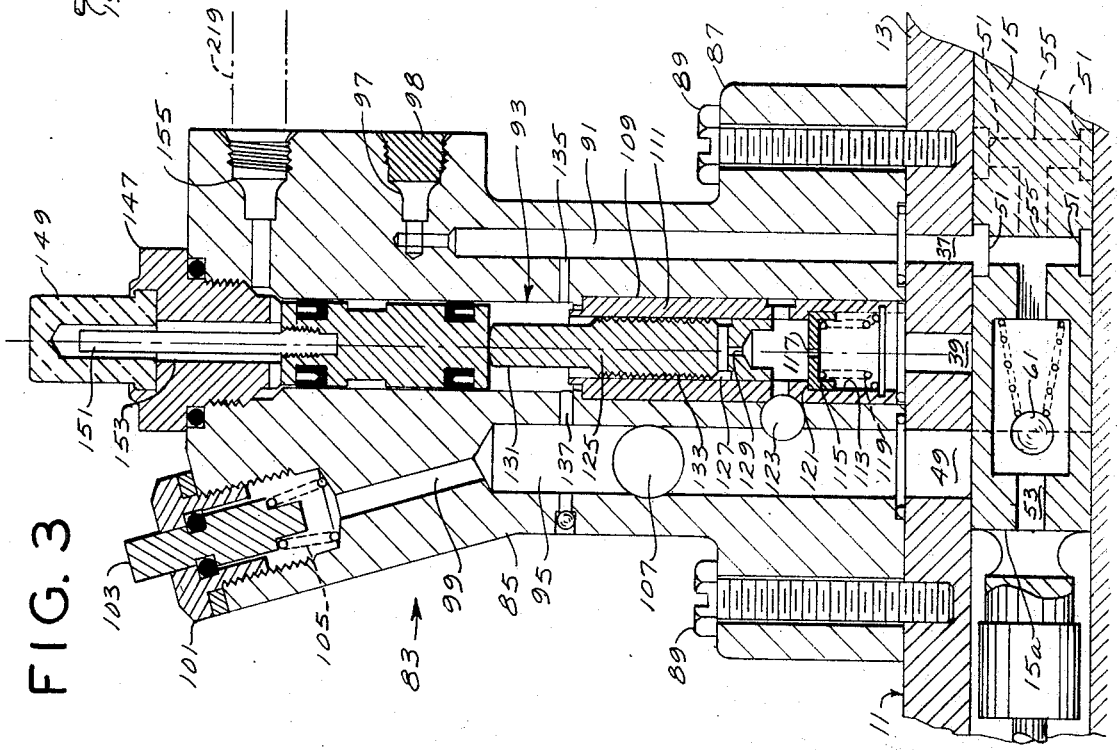
FIG. 3 is a vertical section on line 3—3 of FIG. 2.

Referring to the drawings, there is generally indicated at 11 a lubricant pump or injector which corresponds essentially to the lubricant pump or injector shown in the aforesaid U.S. Pat. 3,322,234 (designated 11) therein. Generally, this injector comprises a cylinder 13 having a plunger 15 working therein. The cylinder has a series of outlet ports spaced at intervals along its length, the first outlet port in this series being shown at 37 and the last outlet port in the series being shown at 39. Reference may be made to U.S. Pat. 3,322,234 and also to U.S. Pat. 2,694,977 for details as to the intermediate outlet ports. The cylinder also has an inlet port 49. Ports 37, 39 and 49 correspond to the ports designated by these same numerals in said U.S. Pat. 3,322,234. The plunger has an annular groove 51, an axial passage 53 and radial ports 55 which establish fluid communication between passage 53 and groove 51. A spring-loaded ball check valve 61 permits fluid flow only in the direction from the left end 15a of the plunger, which is its forward end, through passage 53 to the groove 51. The plunger has a retracted position toward the right of its FIG. 3 position, illustrated by the dotted line positions of the left end 15a and groove 51, in which lubricant may enter the cylinder via inlet port 49, the plunger then blocking the outlet ports. When the plunger is moved toward the left from its retracted position through a pressure stroke, it first closes off the inlet port, and groove 51 sweeps past the outlet ports to force out a small metered volume of lubricant through each outlet port in succession. FIG. 3 shows the groove 51 sweeping past the first outlet port 37. The plunger is operated by an air motor, not shown herein, but fully shown in said U.S. Pat. 3,322,234, to which reference may be made for full details.

A failure indicator of this invention, generally designated 83, is shown to comprise a body 85 having an enlarged base 87 secured to the top of the injector cylinder 13 by screws 89 (similar to the arrangement shown in said U.S. Pat. 3,322,234). The body 85 has a vertical passage 91 at the right as shown in FIG. 3 extending up from its bottom in communication with the first outlet port 37, a vertical bore 93 extending entirely through the body from top to bottom in register at its lower end with the last outlet port 39, and a vertical passage 95 at the left as shown in FIG. 3 extending up from its bottom in communication with the cylinder inlet port 49. Bore 93 is located between passages 91 and 95.

Passage 91 terminates short of the upper end of the body 85, and is intersected at its upper end by a horizontal port 97 drilled in from the right end of the body. This port 97 is usually plugged as indicated at 98. Passage 95 terminates short of the upper end of the body 85, and is intersected at its upper end by an inclined passage 99 drilled down from the top of the body. The upper end of this inclined passage 99 is enlarged, and has a cap 101 threaded therein. A manually operable push-button type vent valve 103 is normally held closed by a spring 105, and is adapted to be pushed in to open it when the system is initially primed with lubricant, or at other times for purging air from the system. Body 85 has an inlet port 107 in communication with passage 95 for delivery of lubricant thereto from a supply at relatively low pressure (of the order of 10–15 p.s.i., for example). The lower part of bore 93 is of slightly enlarged diameter as indicated at 109 for reception of a hollow cylinder liner 111. This liner is counterbored at its lower end providing a chamber as indicated at 113 in communication with the last outlet port 39 of the injector. A cup member 115 having a center hole 117 is slidable in this chamber, being biased upward by a spring 119 toward engagement with the annular shoulder 121 at the upper end of the chamber. Just above the chamber 113, there is a cross port 123 between the bore of the liner 111 and the passage 95. A valve plunger 125 is vertically slidable in the bore in the liner, having a sliding sealing fit therein. This valve plunger has an annular peripheral groove 127 spaced from its lower end, and a passage 129 from its lower end to this groove. At its upper end, the valve plunger has a reduced-diameter extension 131, and it is formed on its periphery from groove 127 on up to the root of extension 131 with a helical groove 133 providing a capillary passage for lubricant. Just above the upper end of the liner, there is a cross port 135 between passage 91 and the bore 93 and a cross port 137 between bore 93 and passage 95.

An air piston 139 is slidable in the bore 93 above the upper end of the liner, its lower end being engageable with the upper end of the valve plunger extension 131. This piston has an annular peripheral groove 141, and packing 143 and 145 above and below this groove. A head 147 is threaded in the upper end of the bore 93 and carries a transparent cap 149. An indicator stem 151, which may be suitably colored (red, for example) extends from the upper end of the piston through a central bore 153 in the head into the cap. An air inlet 155 is provided in the body leading into the bore 93 at the lower end of the head 147 for supplying pulses of air under pressure for driving the piston downward, as will appear.

Figure 5:
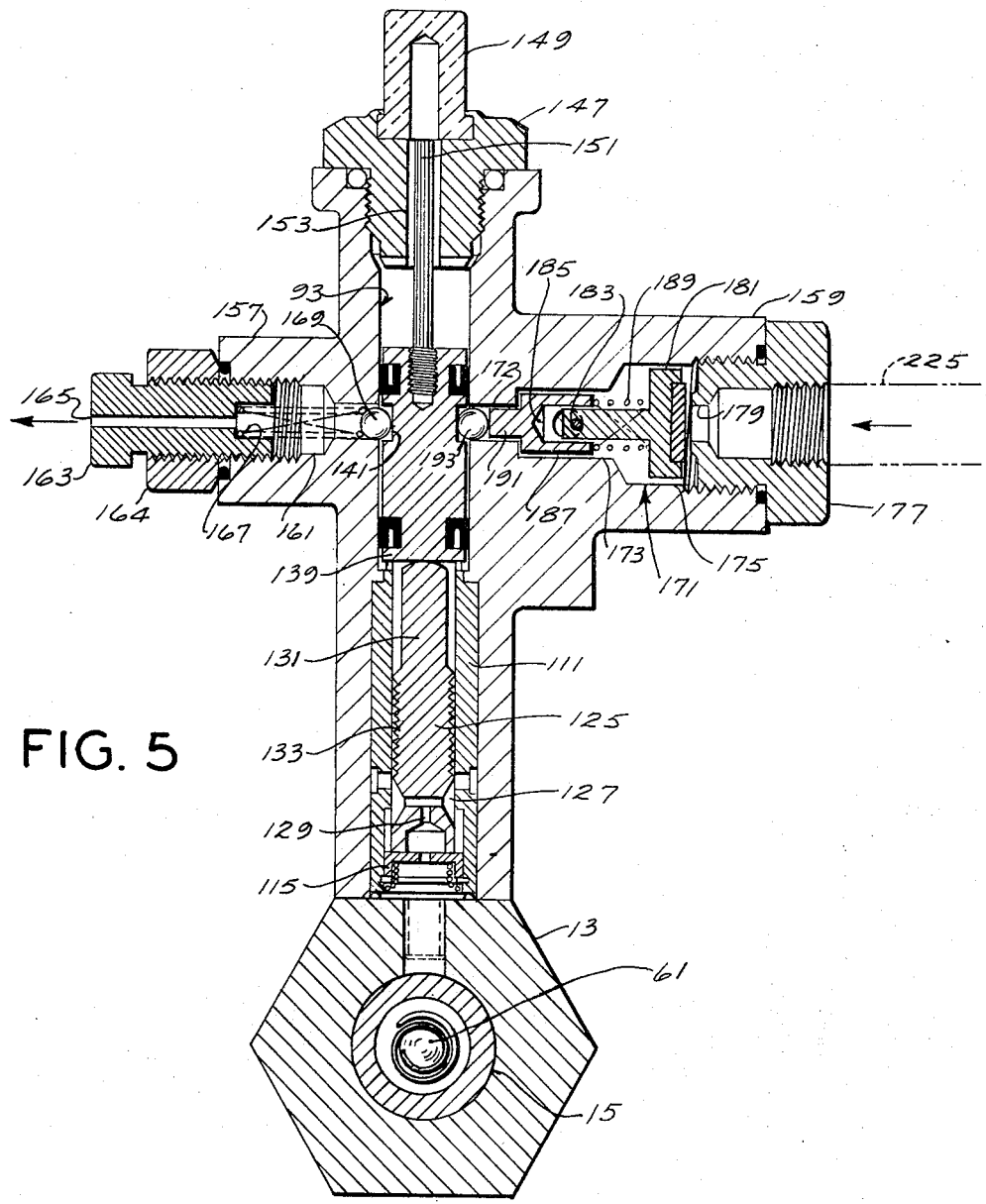
FIG. 5 is a view corresponding to FIG. 2 showing a moved position of parts.
Figure 6:
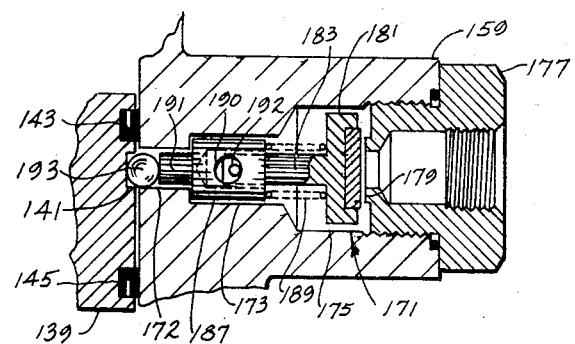
FIG. 6 is an enlarged fragment of FIG. 5, showing certain parts in side elevation instead of in section.
Corresponding reference characters indicate corresponding parts throughout the several views of the drawings.

The body 83 is formed with aligned lateral bosses 157 and 159 on opposite sides thereof, located above the upper end of the liner 111 (see FIGS. 2 and 5). The boss 157, which is relatively short, has a hole 161 having a reduced-diameter inner end 162 extending inward to the bore or air piston chamber 93. A tubular screw 163 is adjustably threaded in the outer end of hole 161, and is adapted to be locked in adjusted position by a lock nut 164. The hole 165 in the screw 163 provides an air vent passage. A spring 167 reacts from the inner end of the screw against a detent ball 169 in the reduced-diameter inner end 162 of the hole 161, the ball having a sufficiently loose fit in 162 for passage of air therearound. The boss 159, which is relatively long, has a hole 171 extending inward to the air piston chamber 93, in line with the hole 161 and on the opposite side of chamber 93 therefrom. This hole 171 has a small-diameter inner end portion 172 opposite the small-diameter inner end 162 of hole 161, an intermediate counterbore 173 and an outer end counterbore 175. A tubular fitting 177 is threaded in the outer end counterbore 175 of hole 171. This fitting is formed with a valve seat 179 at its inner end. A vent valve 181 is engageable with this valve seat. The valve 181 has a stem 183 which extends into a recess 185 in a plunger 187 having a loose sliding fit in the intermediate counterbore 173. This fit is sufficiently loose for passage of air around the plunger. The stem 183 has a sliding telescopic fit in the recess 185. A coil compression spring 189 surrounding the valve stem 183 acts at one end against the outer end of the plunger 187 and at its other end against the valve 181. The plunger 187 has a nose 191 at its inner end engaging a detent ball 193 in the inner end 172 of the hole 171. Both the nose 191 and the ball 193 have a sufficiently loose fit in 172 for passage of air therearound. The plunger 187 is formed with a transverse circular hole 190, and the stem 183 has a transverse pin 192 at its inner end of substantially smaller size than the hole 190, the ends of the pin being received in the hole 190. The spring 189 tends to bias the plunger 187 and valve 181 apart to a position of maximum extension determined by engagement of the pin 192 with the right side of the hole 190. In this position of maximum extension of the plunger and valve, their overall length is slightly less than the distance D (see FIG. 6) from the valve seat 179 to the ball 193 when the latter is in the groove 141. As shown in FIG. 2, the assembly of the plunger 187 and valve 181 is maintained in compressed condition between the ball 193 and the valve seat 179 for sealing of the valve against the seat when the air piston 139 is raised. Air piston 139 is adapted to move downward from its FIG. 2 position to a valve-release position wherein groove 141 in the piston registers with holes 162 and 172. Ball 169 is thereupon biased by spring 167 into the groove 141. Spring 189 drives plunger 187 and ball 193 toward the left as viewed in the drawings, ball 193 entering the groove 141. This eliminates the spring force on the valve 181, and the latter opens under pressure of air in a sensing line 225 (to be later described) connected to fitting 177, for venting air from this line via hole 171, groove 141, hole 161 and the hole 165 in screw 163.

The valve plunger 125 and air piston 139 are adapted to rise to the fully raised retracted position illustrated in FIGS. 2 and 3, determined by engagement of the upper end of the air piston with the lower end of head 147, which is of reduced diameter and provided with a transverse slot 194 for application of pressure air to the upper end of the piston. When the piston is in this retracted position, the detent balls 169 and 193 engage the periphery of the piston just above the lower piston packing 145 at a distance X below the piston groove 141. The piston must travel downward this distance from its retracted position before the balls snap into the groove 141.

Figure 4:
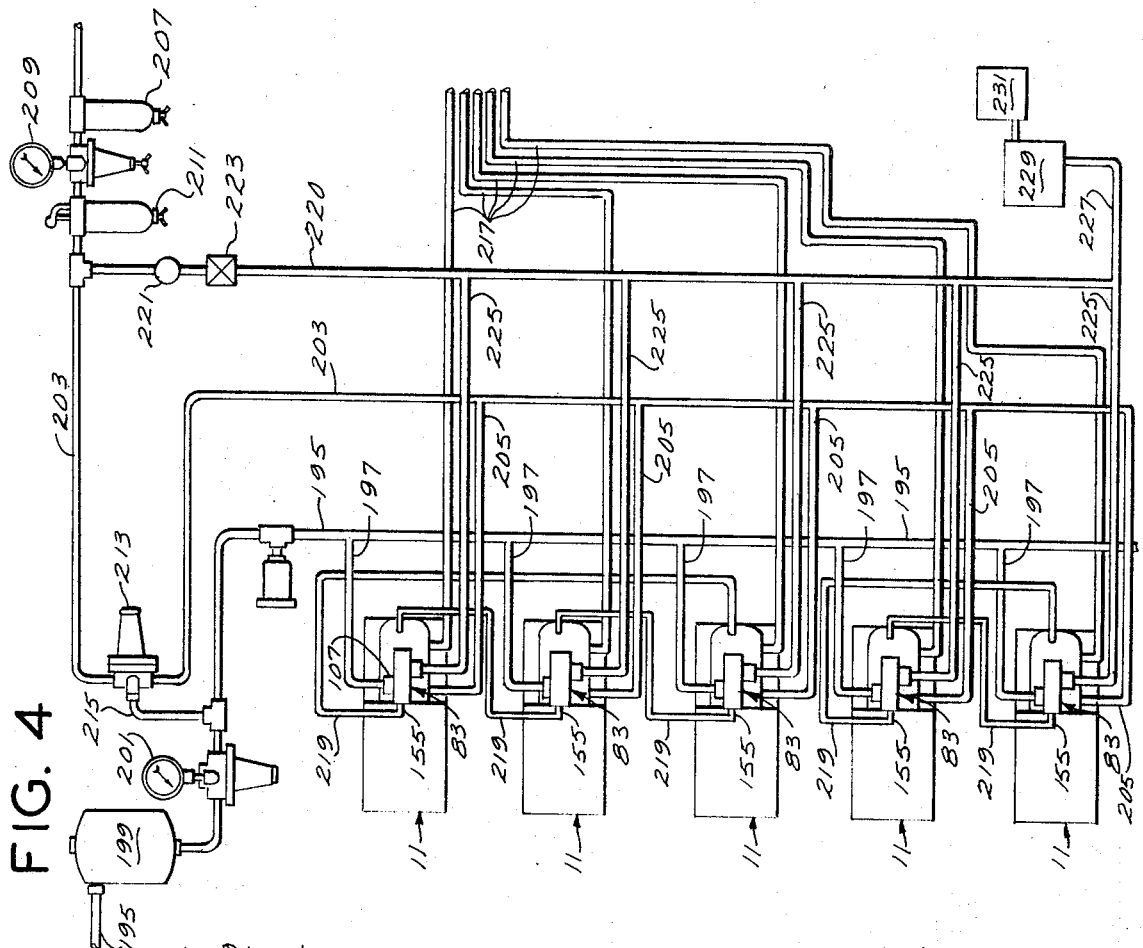
FIG. 4 is a diagram of a lubricant and air supply system for a plurality of injectors each equipped with a failure indicator of this invention.

FIG. 4 shows five injectors 11 each having a failure indicator 83 connected in a system for supplying the injectors with lubricant, periodically pulsing the failure indicators with air, and sensing failure of any of the injectors. As shown therein, lubricant is supplied from a source under pressure to the lubricant inlet ports 107 of the injectors via a lubricant supply line 195 and branch lubricant lines 197. The lubricant supply line has a lubricant filter 199 and a pressure gauge 201 therein. The air motors for actuating the plungers of the injectors are supplied with air under pressure from a suitable source via an air supply line 203 and branch air lines 205. The air supply line includes an air filter 207, an air pressure gauge 209, an air line lubricator 211, and a pressure-responsive valve 213 responsive to pressure of lubricant in the lubricant supply line 195 via a connection 215 for shutting off the air supply to the injectors on drop of lubricant pressure. Operation of the air motors for actuating the plungers of the injectors is under control of air vent lines 217 which are connected to a timing valve unit (as described in U.S. Pat. 3,322,234).

Pulses of air are periodically supplied to the air pulse ports 155 of the failure indicators 83 via lines 219 interconnecting air motor ports such as indicated at 81 in the aforesaid U.S. Pat. 3,322,234 and ports 155. By reference to said U.S. Pat. 3,322,234, it will be apparent that, on each stroke of each air motor, a pulse of air is delivered therefrom, and these pulses are delivered via lines 219 to the air pulse ports 155 of the failure indicators. Thus, as shown in FIG. 4 by way of example only, the pulse from the air motor for the first injector 11 (the one toward the top of FIG. 4) is delivered to the air pulse port 155 of the failure indicator 83 for the second injector 11, the pulse from the air motor for the second injector is delivered to the failure indicator for the third injector, the pulse from the air motor for the third injector is delivered to the failure indicator for the first injector, the pulse from the air motor for the fourth injector is delivered to the failure indicator for the fifth injector, and the pulse from the air motor for the fifth injector is delivered to the failure indicator for the fourth injector. As to the failure indicator of any given injector, the pulse of air is generally delivered thereto after the retraction of the injector plunger (i.e., between cycles of the injector).

A main sensing air line 220 is taken off the air supply line 203 between the air line lubricator 211 and the valve 213. This sensing air line has a pressure regulator 221 and a restrictor 223 therein, and has branch sensing air line connections 225 to the fittings 177 of the failure indicators 83. It also has a connection 227 to a pressure switch 229. The latter, in response to drop in air pressure in lines 220 and 227, is adapted to actuate a signal 231, which may be an audible or visual alarm, or both, or a means for shutting down the device served by the injectors.

Operation is as follows:

FIG. 3 illustrates the injector plunger 15 in the course of its movement through a pressure stroke, in the position wherein the groove 51 in the plunger is passing the first outlet port 37. The retracted position of the plunger is toward the right of that shown in FIG. 3, as illustrated in dotted lines, wherein the plunger blocks the first outlet port 37 and the last outlet port 39 (and all the outlet ports between the first and last), and unblocks the inlet port 49 for charging the injector cylinder with lubricant from passage 95. It will be understood that the retracted position of the plunger is such that, as it moves to the left through a pressure stroke, it blocks off the inlet port 49 generally at the instant that groove 51 comes into communication with the first inlet port. Then, as the plunger continues its movement toward the left through a pressure stroke, groove 51 moves into communication with the successive outlet ports until it crosses the last outlet port 39. As the groove successively crosses the outlet ports, a metered amount of lubricant is forced out through each outlet port, including the last outlet port 39, assuming the injector is operating properly. After the delivery of the charge through the last outlet port, the plunger 15 is retracted for the next cycle of operation.

It may be assumed that, at the start of any cycle of the injector, all spaces in the failure indicator which are in communication with the lubricant inlet port 107 (e.g., passage 95, the spaces above and below the valve plunger 125, passage 91) are full of lubricant at the low lubricant supply pressure. The air piston 139 and valve plunger 125 will generally occupy a position below their fully raised position of FIGS. 2 and 3, but above their fully lowered position of FIG. 5.

On a pressure stroke of the plunger 15, the volume of lubricant discharged through the first outlet port 37 as the plunger groove sweeps by the latter into passage 91 is fed back into the inlet passage 95 via port 135, the space above the valve plunger 125 and port 137. Lubricant discharged through the intermediate outlet ports is delivered to various points of lubrication. The volume of lubricant discharged through the last outlet port 39 is delivered into the space below the valve plunger 125 at high pressure. This drives the valve plunger 125 and the air piston 139 upward to their fully raised retracted position of FIGS. 2 and 3. The stem 151, appearing fully raised in transparent cap 149, indicates that proper discharge has occurred through the last outlet port. Following the delivery through the last outlet port, the plunger 15 is retracted. The pressure and excess volume of lubricant is dissipated to passage 95 via the port 123.

Following the retraction of the plunger, a momentary pulse of air is delivered via line 219 to the upper end of the air piston 139. This drives the air piston and the valve plunger 125 downward a limited distance, only a fraction of distance X, by forcing a fraction of the lubricant in the chamber below the piston 125 to flow through the helical groove 133 and port 137 to the passage 95, so that vent valve 181 remains closed. The stem 151 moves down to indicate that the plunger 15 has completed a cycle (i.e., to indicate that it has been retracted) and remains down until the next pressure stroke. Assuming the injector is operating properly, the valve plunger and piston rise back to their retracted position on the next pressure stroke of plunger 15 as above described.

Failure of proper operation of injector 11 for any of various reasons is inherently reflected in failure of delivery of lubricant through the last outlet port 39. Whenever this occurs, on each ensuing delivery of a pulse of air to the upper end of the air piston 139, the air piston is driven downward one step, a fraction of the distance X, and drives the valve plunger downward accordingly. After a number of such pulses, each resulting in the piston being driven downward one step, air piston 139 reaches the point where the balls 169 and 193 snap into the groove 141 in the air piston, as shown in FIG. 5. When this occurs, the force of spring 189 on the vent valve 181 is eliminated, and the sensing line 225 is vented to vent the pressure switch 229, thereby actuating the signal 231 to signal the failure of the injector.

As will appear from the above, the failure indicator of this invention utilizes air instead of lubricant as the sensing medium for actuating the signal, and is insensitive to the amount of lubrcant delivered thereto. Whatever the amount of lubricant delivered thereto via the first and last outlet ports, the operation remains the same.

It will be understood that the apparatus of this invention may be useful in association with pumps for pumping fluids other than lubricant.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for detecting failure of delivery of an intermittently acting pump comprising a signal, air pressure means controlling the signal, and means responsive to failure of delivery of the pump for a plurality of cycles of its operation for controlling said air pressure means to effect operation of the signal, wherein said pump is a lubricant injector comprising a cylinder having an inlet supplied with lubricant from a source, a series of outlet ports spaced at intervals along its length and a plunger working in the cylinder adapted on a pressure stroke to force a metered volume of lubricant out through each outlet port in succession, said failure-responsive means being responsive to failure of delivery of lubricant through the last outlet port of the series for a plurality of strokes of the plunger, wherein said air pressure means effects operation of the signal on drop of air pressure, and said failure-responsive means is operable to drop the air pressure in response to failure of delivery of lubricant through the last outlet port for a plurality of strokes of the plunger, wherein said failure-responsive means comprises a vent valve for normally holding pressure in said air pressure means, and means for releasing the vent valve in response to failure of delivery of lubricant through the last outlet port for a plurality of strokes of the plunger, wherein said means for effecting release of the vent valve comprises an air-actuated piston movable away from a retracted position to a valve-release position, and means for delivering a pulse of air to the piston following each operation of the plunger to drive the piston in steps toward its valve-release position.

2. Apparatus as set forth in claim 1 wherein the means for effecting release of the vent valve comprises spring means for holding the vent valve closed, and means for eliminating the force of said spring means on the vent valve in response to movement of the air piston to its valve-release position.

3. Apparatus for detecting a failure of delivery of an intermittently-operated pump comprising a body having a passage for supply of fluid to the inlet of the pump, said body being formed to provide a cylinder, said cylinder being open at one end constituting its inner end for communication with a pump outlet for delivery thereto of the discharge through said outlet and being closed at its other and outer end, a valve plunger slidable in the cylinder toward and away from the open end of the cylinder and, said valve plunger formed to provide a restricted passage from one end thereof to the other, an air piston slidable in the cylinder between its closed end and the valve plunger and having its inner end engageable with the outer end of the valve plunger while providing an intermediate space therebetween, said body having a port interconnecting the space at the inner end of the cylinder with the supply passage and a port connecting said intermediate space with said supply passage, means for delivering pulses of air to the outer end of the cylinder, said body having means for connection of an air sensing line, a valve in said body for said line, and means controlled by said piston controlling the valve.

4. Apparatus as set forth in claim 3 wherein said restricted passage is constituted by a helical groove in the periphery of the valve plunger.

5. Apparatus as set forth in claim 4 wherein said piston is movable inward from an outer retracted position, and has a recess therein, and said valve control means includes means biased for entry into said recess when the piston moves inward from its retracted position a predetermined distance.

6. Apparatus as set forth in claim 5 wherein said body has an air inlet extending inward toward the cylinder and an air outlet extending outward from the cylinder, said valve being a vent valve slidable outward in the air inlet against a seat, said valve control means comprising a detent ball at the inner end of the air inlet adapted to snap into the recess in the piston, a plunger between the ball and the valve, and spring means interposed between the plunger and the valve.

7. Apparatus as set forth in claim 6 wherein the recess in the plunger is an annular peripheral groove, and wherein a detent ball is provided at the inner end of the air outlet, and spring means is provided for biasing the latter detent ball inward.

8. Apparatus as set forth in claim 3 for use with a pump comprising a cylinder having an inlet adapted to be supplied with fluid from said supply passage, a series of outlet ports spaced at intervals along its length, and a plunger working in said pump cylinder adapted on a pressure stroke to force a metered volume of fluid out through each outlet port in succession, the cylinder in said body being adapted for communication with the last outlet port of the series, and said body further having a passage adapted for communication with the first outlet port of the series and in communication with said intermediate space.

9. Apparatus as set forth in claim 8 wherein said restricted passage in constituted by a helical groove in the periphery of the valve plunger.

10. Apparatus as set forth in claim 9 wherein said piston is movable inward from an outer retracted position, and has a recess therein, and said valve control means includes means biased for entry into said recess when the piston moves inward from its retracted position a predetermined distance.

11. Apparatus as set forth in claim 10 wherein said body has an air inlet extending inward toward the cylinder and an air outlet extending outward from the cylinder, said valve being a vent valve slidable outward in the air inlet against a seat, said valve control means comprising a detent ball at the inner end of the air inlet adapted to snap into the recess in the piston, a plunger between the ball and the valve, and spring means interposed between the plunger and the valve.

12. Apparatus as set forth in claim 11 wherein the recess in the plunger is an annular peripheral groove, and wherein a detent ball is provided at the inner end of the air outlet, and spring means is provided for biasing the latter detent ball inward.

References Cited
UNITED STATES PATENTS

| | | | |
|---|---|---|---|
| 2,615,419 | 10/1952 | Topping | 184—1 XR |
| 2,908,898 | 10/1959 | Mueller et al. | 340—270 |
| 3,026,387 | 3/1962 | Ashbaugh | 184—6 XR |
| 3,223,198 | 12/1965 | Gruber | 184—6 XR |
| 3,322,234 | 5/1967 | Mueller et al. | 184—6 |
| 3,432,004 | 3/1969 | Lyth | 184—6 |

MANUEL A. ANTONAKAS, Primary Examiner

U.S. Cl. X.R.
184—6; 340—270